(12) United States Patent
Gottlieb et al.

(10) Patent No.: US 8,195,496 B2
(45) Date of Patent: Jun. 5, 2012

(54) COMBINING MULTIPLE OBJECTIVE FUNCTIONS IN ALGORITHMIC PROBLEM SOLVING

(75) Inventors: Jens Gottlieb, Schwetzingen (DE); Lars Vogel, Eppelheim (DE)

(73) Assignee: SAP Aktiengesellschaft, Walldorf (DE)

( * ) Notice: Subject to any disclaimer, the term of this patent is extended or adjusted under 35 U.S.C. 154(b) by 760 days.

(21) Appl. No.: 12/324,155

(22) Filed: Nov. 26, 2008

(65) Prior Publication Data

US 2010/0131444 A1 May 27, 2010

(51) Int. Cl.
*G06Q 10/00* (2012.01)
(52) U.S. Cl. ............................ 705/7.12; 705/7.11; 703/2
(58) Field of Classification Search ............... 705/7.12, 705/7.11; 703/2
See application file for complete search history.

(56) References Cited

U.S. PATENT DOCUMENTS

| | | | | |
|---|---|---|---|---|
| 5,517,654 A * | 5/1996 | Kimbel et al. | | 712/30 |
| 5,897,629 A * | 4/1999 | Shinagawa et al. | | 706/13 |
| 5,940,816 A * | 8/1999 | Fuhrer et al. | | 706/13 |
| 6,064,819 A * | 5/2000 | Franssen et al. | | 717/156 |
| 6,088,690 A * | 7/2000 | Gounares et al. | | 706/13 |
| 6,182,014 B1 * | 1/2001 | Kenyon et al. | | 702/14 |
| 6,314,361 B1 * | 11/2001 | Yu et al. | | 701/120 |
| 6,704,692 B1 * | 3/2004 | Banerjee et al. | | 702/189 |
| 6,768,973 B1 * | 7/2004 | Patel | | 703/2 |
| 6,865,567 B1 * | 3/2005 | Oommen et al. | | 1/1 |
| 6,882,988 B2 * | 4/2005 | Subbu et al. | | 706/10 |
| 7,047,169 B2 * | 5/2006 | Pelikan et al. | | 703/2 |
| 7,089,220 B2 * | 8/2006 | Fromherz et al. | | 706/45 |
| 7,114,146 B2 * | 9/2006 | Zhang et al. | | 717/106 |
| 7,653,561 B2 * | 1/2010 | Bergstrom | | 705/7.22 |
| 7,720,795 B2 * | 5/2010 | Earley et al. | | 707/805 |
| 8,046,319 B2 * | 10/2011 | Satir et al. | | 706/46 |
| 2002/0026340 A1 * | 2/2002 | Kauffman | | 705/7 |
| 2002/0107819 A1 * | 8/2002 | Ouimet | | 705/400 |
| 2002/0184176 A1 * | 12/2002 | Fromherz et al. | | 706/45 |
| 2004/0002412 A1 * | 1/2004 | Kuo | | 482/123 |

(Continued)

FOREIGN PATENT DOCUMENTS

JP 09034715 A * 2/1997

OTHER PUBLICATIONS

Benkhider, S. et al., "A New Generationless Parallel Evolutionary Algorithm for Combinatorial Optimization," (2007) IEEE Congress on Evolutionary Computation pp. 4691-4697.*

(Continued)

*Primary Examiner* — Beth V Boswell
*Assistant Examiner* — Tiphany Dickerson
(74) *Attorney, Agent, or Firm* — Blakely, Sokoloff, Taylor & Zafman LLP

(57) ABSTRACT

Combining multiple objective functions to perform algorithmic problem solving is described. A first algorithm performs processing on a complex problem and generates multiple solutions to the problem. One or more solutions as generated by the first algorithm are send to one or more additional algorithms for further processing of complex sub-problems bounded by the first algorithm. The solutions to the first algorithm are used as input to the additional algorithms, where those solutions include at least one boundary condition under which the additional algorithms process the sub-problems. Ultimate solutions satisfy boundary conditions of the first algorithm, and all conditions of the additional algorithms. Algorithms may be executed in combinations of parallel and/or sequential operation to generate a final solution considering multiple different sub-problems to the complex problem.

19 Claims, 4 Drawing Sheets

U.S. PATENT DOCUMENTS

| | | | |
|---|---|---|---|
| 2004/0015381 A1* | 1/2004 | Johnson et al. | 705/8 |
| 2004/0107110 A1* | 6/2004 | Gottlieb et al. | 705/1 |
| 2004/0210543 A1* | 10/2004 | Ouimet | 705/400 |
| 2004/0220790 A1* | 11/2004 | Cullick et al. | 703/10 |
| 2004/0220910 A1* | 11/2004 | Zang et al. | 707/3 |
| 2005/0027579 A1* | 2/2005 | Tiourine et al. | 705/8 |
| 2005/0187849 A1* | 8/2005 | Bollapragada et al. | 705/36 |
| 2006/0241822 A1* | 10/2006 | Yadappanavar et al. | 701/5 |
| 2006/0241986 A1* | 10/2006 | Harper | 705/7 |
| 2006/0271210 A1* | 11/2006 | Subbu et al. | 700/44 |
| 2007/0087756 A1* | 4/2007 | Hoffberg | 455/450 |
| 2007/0168307 A1* | 7/2007 | Floudas et al. | 706/19 |
| 2007/0244677 A1 | 10/2007 | Malitski et al. | |
| 2008/0046302 A1* | 2/2008 | Cartwright et al. | 705/8 |
| 2008/0065262 A1 | 3/2008 | Gottlieb et al. | |
| 2008/0077464 A1 | 3/2008 | Gottlieb et al. | |

OTHER PUBLICATIONS

Crainic, T., Parallel Solution Methods for Vehicle Routing Problem, In: The Vehicle Routing Problem. Operations Research/Computer Science Interfaces Series, 2008, vol. 43, Part I, 171-198.*

Eckert C., (2002) Direct Representation and Variation Operators for the Fixed Charge Transportation Problem. In: Parallel Problem Solving in Nature VII. Lecture Notes in Computer Science, vol. 2439, pp. 77-87.*

Gottlieb, J. et al., A Comparison of Two Representations for the Fixed Charge Transportation Problem. In: Parallel Problem Solving in Nature VI. Lecture notes in computer science, (2000), vol. 1917, pp. 345-354.*

Gottlieb, J., "Permutation-Based Evolutionary Algorithms for Multidimensional Knapsack Problems" (2000), SAC'00, Mar. 19-21, Como, Italy, pp. 408-414.*

Raidl, G. R., et al., "Empirical Analysis of Locality, Heritability and Heuristic Bias in Evolutionary Algorithms: A Case Study for the Multidimensional Knapsack Problem" (2005) Evolutionary Computation, vol. 13, Iss. 4, pp. 441-475.*

Tan, K. C., et al., "A Hybrid Multiobjective Evolutionary Algorithm for Solving Vehicle Routing Problem with Time Windows," (2006), Computational Optimization and Applications, 34, pp. 115-151.*

* cited by examiner

COMBINING MULTIPLE OBJECTIVE FUNCTIONS IN ALGORITHMIC PROBLEM SOLVING

FIELD

Embodiments of the invention are generally related to solving logistical problems, and more particularly to combining multiple objective functions in algorithmic problem solving.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2008, SAP, AG. All Rights Reserved.

BACKGROUND

Problems that involve combinations of multiple variables that can be manipulated independently are typically solved with processing-intensive solution methods. Such a problem may be referred to as a logistical problem, where the problem does not have a solution consisting of a simple yes or no, or even an answer to a numeric calculation. Rather, a set of solutions can be generated that satisfies each of the variables in different combinations, creating multiple potential solutions. A problem solving system may include an algorithm that generates potential solutions to a logistical problem. As a general rule, the solutions to logistical problems are based on heuristics, for example, where certain assumptions and/or generalizations are made regarding an aspect of the logistical problem.

As an example, consider supply chain management (SCM), where the logistics of the SCM includes planning and implementing the movement and storage of goods or services. A supply chain is a network of retailers, distributors, transportation service providers, warehouses, and suppliers that take part in the production, delivery and sale of goods or services. The movement of goods and services through a supply chain may include shipment or transportation of goods from one location to another. The shipment of goods involves one or more vehicles such as trucks, ships, trains, or airplanes, and involves the planning of the arrangement of the goods to be shipped in the vehicle. The shipment of goods may involve complex constraints, which are evaluated by the SCM logistics.

The goal of logistics is creating effective solutions to movement and storage problems, knowing that "perfect" solutions may be infeasible given the number of considerations or variables at play. For example, in goods transportation, the movement of the goods involves, among other things, selecting a schedule for shipment, selecting a carrier, and loading the goods into the carrier's vehicles. Each aspect of this problem may be a logistical problem, or logistical sub-problem to the original logistical problem of transporting the goods. The SCM system may generalize or ignore certain constraints or conditions to simulate another. For example, an SCM system may use generalized conditions for arrangement of goods for shipping (e.g., ignoring whether crates used are stackable, or ignoring specific geometries of shipping vehicles available). While ignoring or not considering certain specific conditions may be tolerable in certain instances, it may not be desirable in other instances. For example, certain unconsidered conditions may be considered significant in certain contexts (e.g., generalizing costs of shipping instead of factoring exact shipping costs may be considered to generalize or ignore an important consideration).

Generalizing certain considerations as a rule may result in a problem solving system that fails to consider a condition deemed significant to a user of the system. Not having the ability to consider certain conditions may make the problem solving system less useful.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
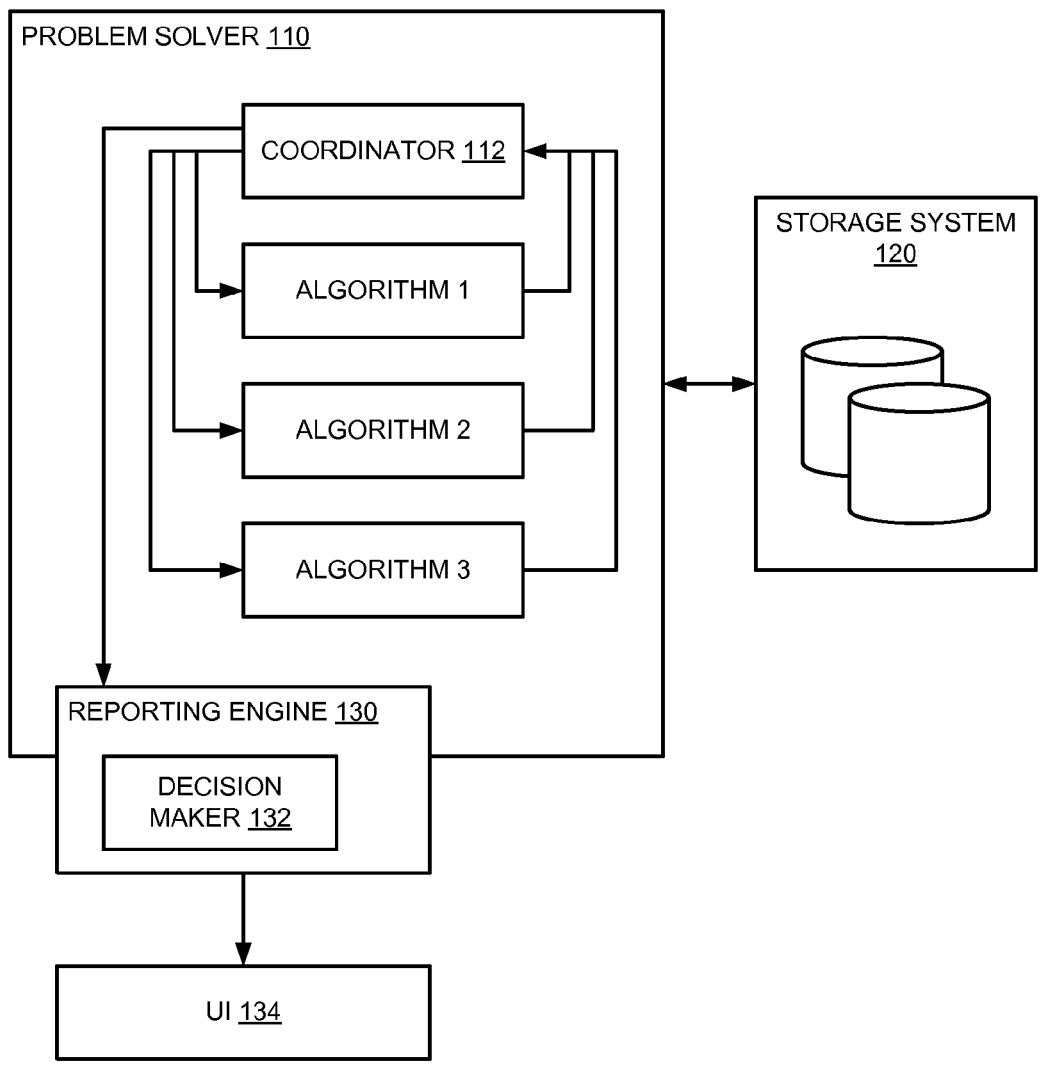
FIG. 1 is a block diagram of an embodiment of a system that combines multiple objective functions in algorithmic problem solving.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods, apparatuses, and systems enable a problem solving system that combines multiple objective functions to perform algorithmic problem solving. Each objective function may be provided by an algorithm. A first or primary algorithm may generate multiple solutions based on general criteria with respect to at least one aspect of a problem. Secondary or slave algorithms can then generate solutions based on the solutions generated by the primary algorithm, and further refined by detail criteria with respect to the one aspect of the problem that is evaluated generally by the primary algorithm. The combination of the algorithms is thus accomplished by executing the secondary algorithm with the solution to the primary algorithm as an input, evaluated in relation to additional conditions not considered in detail by the primary algorithm.

In one embodiment, the problem is a logistical problem. It will be understood that a logistical problem may generally include the movement of goods or the flow of services, or any equivalent. Examples include the transportation of goods, as discussed above, for example, in a supply chain context, as well as military logistics that includes movement of resources, including supplies and people, as well as the flow of services, for example in the energy sector. The combining of objective functions in algorithmic problem solving is not unique to logistics, however. Those of skill in the art will understand that any algorithmic problem solving that involves making a generalization about a particular condition or variable could also benefit by performing problem solving as described herein.

More particularly, a master process or master algorithm manages the flow of problem solving. The master process or algorithm is a module or functional block that receives the request to perform the problem solving processing and directs the execution of the algorithms to generate the solution(s). The master algorithm initiates a base algorithm, referred to as the primary algorithm above, which generates "baseline" solutions to the problem. A baseline solution is one of multiple solutions that each satisfy all conditions of the base algorithm. However, the base algorithm generalizes at least one factor of the problem, meaning that all solutions satisfy the condition generally, but are not solutions generated by evaluating detail criteria of the factor.

The master algorithm also initiates secondary algorithms, which may be referred to as slave algorithms, which evaluate solutions generated by the base algorithm for evaluation in light of additional conditions, including detail criteria with respect to the one factor. The solution of the base algorithm thus acts as a bound or boundary condition for the slave algorithm or algorithms, and all solutions to the slave algorithm must not only satisfy the detail criteria of the one factor, but be within the solution of the base algorithm. Thus, multiple solutions based on a general solution can be generated, or a general solution can be evaluated for feasibility in light of additional considerations or conditions. From the perspective of each algorithm separately solving its own objective problem, the base algorithm can be considered to generate solutions to the general problem, and the slave algorithms generate solutions to sub-problems within the general problem.

As an example, consider a supply chain issue with transportation of goods. For purposes of example, supply chain management (SCM) is used herein as the surrounding application domain. Additionally, the solutions may apply to applications in the Logistics Service Providers (LSPs) domain. A general transportation plan may be generated as a solution to how to ship goods from one location to another, but the transportation plan may fail to consider exact freight costs. It will be understood that a "plan" refers herein to a series or set of actions to be performed to execute the process. For example, a transportation plan may specify time of a shipment of goods, a shipment type, vehicle type, route, etc. Rather than considering exact freight costs, the general solution may use a set of generalized values that represents averages, estimates, or worst-case scenarios instead of actual freight costs. The evaluation of the actual freight costs may include an additional number of factors that would make execution of the general solution infeasible if the actual costs were to be evaluated by the general solution. Instead, a slave algorithm that algorithmically computes solutions based on real-world freight costs can be used with solutions generated by the general algorithm as inputs to be considered in light of the detail criteria of actual freight cost information. The evaluation of actual freight costs is itself a problem requiring an algorithmic solution (e.g., the solution is found through iterative processing), in addition to the general algorithmic solution of the general algorithm.

All solutions, or alternatively, selected ones of the solutions, could then be presented to a decision maker to determine one or more actions to perform in light of the solutions.

FIG. 1 is a block diagram of an embodiment of a system that combines multiple objective functions in algorithmic problem solving. System 100 represents the problem solving system. In general, system 100 includes problem solver 110, which is a subsystem that includes various components to perform the processing necessary to generate solutions to a problem. Problem solver 110 includes coordinator 112 to control or manage the flow of problem solving processing. Problem solver 110 includes two or more algorithms that process a problem with algorithmic problem solving. Additional algorithms could also be used. As illustrated, three algorithms are shown, which can be considered a base algorithm (algorithm 1) and two slave algorithms (algorithms 2 and 3).

Problem solver 110 includes reporting engine 130, which represents one or more components that present solutions to a decision maker. In one embodiment, the decision maker is an automated decision maker that may be part of problem solver 110 (as illustrated by decision maker 132) or another part of system 100 (not explicitly shown). In one embodiment, the decision maker is a human user, which can interface with problem solver 110 via user interface (UI) 134. The user may receive solution options, solution results (e.g., if an automated decision maker made a decision), and other results in UI 134.

Problem solver 110 is also connected to storage system 120, which represents persistent storage where detail conditions or other additional information may be stored to provide conditions or considerations for one or more of the algorithms. Coordinator 112 may exchange information with storage system 120 (storing and retrieving results or additional information). In one embodiment, coordinator 112 can retrieve information from storage system 120. Alternatively, coordinator 112 merely indicates the information to use, and the algorithms themselves obtain the information from storage system 120. In one embodiment, coordinator 112 stores the results of one algorithm in storage system 120 or a local memory (not shown in system 100), from which the results can be passed to or obtained by the algorithms for processing.

As shown by the lines with arrows, coordinator 112 selectively initiates execution of each of algorithms 1, 2, and 3. The algorithms can be executed in different orders, and multiple iterations of the slave algorithms could be used. Each algorithm reports its results to coordinator 112 (either by directly passing the result, or storing the result and indicating the storage location to the coordinator).

Another way to view system 100 is that a combined planning problem exists, which will be optimized by one objective function f1. Function f1 returns several solutions (n) for the selected object function. The results of f1 are then evaluated by other objective functions f2, . . . , fm, where m is the number of objective functions, which may typically be different from n. Each objective function can define additional restrictions. A planning algorithm is used to solve the problem for one of these objective functions.

As one possible practical example for FIG. 1, consider a TMS (transport management system) or equivalent available from an enterprise system provider, such as SAP AG of Walldorf, Germany. Problem solving system 110 represents the TMS, which serves to generate transportation plans to provide solutions to transportation problems or scenarios. Coordinator 112 may represent a master algorithm that is part of the TMS, and coordinates the execution of various algorithmic processors that generate transportation solutions. Coordinator 112 as the master algorithm has global control, and receives the results of the base algorithm. Coordinator 112 then distributes the results to the slave algorithms to perform different planning evaluation. An evaluation may consist of additional constraint checks, or even solving a new optimization problem that depends on the solution of the base algorithm.

Algorithm 1 may represent a base algorithm, which may be an algorithm that is executed first to generate solutions that provide the boundaries or baseline for more detailed analysis. For example, algorithm 1 may represent a VSR (vehicle selection and routing) optimizer. Algorithms 2 and 3, as slave algorithms, could provide, for example, VSO (vehicle space optimization) and TSP (transportation service provider) selection functions. It will be understood that "optimize" or other forms derived from that word do not necessarily mean that an absolute ideal solution will be obtained. Rather, the process of optimization in the context of problem solving is generally understood to determine a best solution within given parameters, including the information available, the assumptions made, the generalizations that are made, the time or processing cycles allotted, etc.

Specifically, the run of a VSR optimizer may evaluate many different transportation plans, and return at least a subset of the plans as results. In one embodiment, results may be returned during the run (asynchronously), and other results may be returned after the run is finished. In one example, algorithm 1 performs the task of the transportation service provider (TSP) selection, which is called by coordinator 112 for each returned solution of the VSR optimizer. From a transportation business perspective, the VSR optimizer determines good transportation plans with respect to consolidation of transportation orders into tours, and the TSP selection algorithm assigns a TSP to each tour based on TSP costs. Algorithm 2 performs Vehicle Space Optimization (VSO), which evaluates the solutions of the VSR optimizer to generate a solution with the best VSO value for the given VSR result. In this example, there are two slave algorithms, and the function of one of the slave algorithms may be the dominant one in the problem solving hierarchy.

There may be any of a number of ways to utilize problem solver 110 with the example given: 1) The VSR optimizer can first be executed to generate x solutions, and all x solutions are evaluated by a Freight Costing slave algorithm to generate solutions where a solution with the lowest freight cost is selected; 2) The VSR optimizer can first be executed to generate x solutions, and all x solutions are evaluated by the TSP selection algorithm to generate solutions where a solution with the lowest TSP cost is selected; 3) The VSR optimizer can first be executed to generate x solutions, and all x solutions are evaluated by the VSO optimizer to generate solutions where the solution with the best VSO value is selected; 4) The VSR optimizer can first be executed to generate x solutions, where all x solutions are evaluated by a user defined function model (as a slave algorithm) that checks for additional constraints, where the solution that best meets the user-defined constraints is selected; 5) The VSR optimizer can first be executed to generate x solutions, where each solution is selectively evaluated by one or more of several objective functions, where the solution is selected that provides a lowest value according to a weighted sum of solution evaluations; etc. It will be understood that other examples are possible, and multiple of the above use-case examples may be combined.

The description above with reference to system 100 of FIG. 1 describes a general system on which embodiments of the invention may be implemented. A general description of certain details regarding the combining of multiple objective functions in algorithmic problem solving follows. Such details should be understood as being generally applicable to any embodiment set forth within this description.

In one embodiment, not all solutions generated by the base algorithm are considered by a slave algorithm. Rather, the base algorithm could be configured or directed through control command to output as a "solution" the result obtained, for example, after a certain amount of time, or after a certain number of processing cycles or processing iterations within the iterative processing. Whatever solution is currently produced at the number of processing iterations or the amount of time can be returned as the solution. Alternatively, the algorithm can make comparisons to store a solution and replace the stored solution if the compared solution is better than the stored solution. Thus, at the completion of a period, the algorithm could return a best solution for the period—the interval of time or the number of processing iterations, or computation cycles. In one embodiment, the master algorithm receives the solution and compares it against other solutions generated by the base algorithm to determine if the solution is a duplicate of a solution already generated. If the solution is the same as one already used, a next-best solution could be used. In such an implementation, either the algorithm would need to store two solutions, or a comparison with the master algorithm may need to be made regularly or to compare every generated solution. While referencing a base algorithm, the same could be applied to a slave algorithm that is generating multiple potential solutions to a problem.

Note that slave algorithms could be performed in parallel with the base algorithm, or the base algorithm could, for example, collect a certain number of solutions over a period of time, processing cycles, or processing iterations, and present all solutions at the end of processing. The slave algorithms could thus be executing concurrently with the base algorithm and processing solutions generated by the base algorithm, or multiple slave algorithms could be initiated after the base algorithm completes its processing.

In one embodiment, the base algorithm generates multiple potential solutions, and the one or more slave algorithms perform operations to determine a feasibility of the solutions of the base algorithm. As used herein, feasibility refers to an indication of how the solution compares to an ideal or optimum solution or a theoretically possible solution. In one embodiment, the feasibility is a normalized value. The normalized value may be, for example between 0 and 2, where 1 is an ideal or theoretical solution, and anything less than 1 represents underutilization, and anything more than 1 represents overutilization. As an alternative and as an illustration, consider feasibility return values between 0 and 200, where a value n of 0 to 99 represents space left over in a shipping container (e.g., 98% utilization of a container), and where a value n of 101 to 200 represents a requirement for space in excess of the container's size (e.g., requires 120% of the container). In another embodiment, as described in more detail below, feasibility checks may be weighted prior to being presented to the decision maker. Slave algorithms could instead provide additional solutions, generating multiple potential solutions based on the solution of the base algorithm. For example, a base algorithm may generate a plan, which could be input into a slave algorithm that outputs a revised plan based on the detail considerations of the slave algorithm. A system could also have slave algorithms that generate "solutions" and other slave algorithms that generate "feasibility checks." Thus, combinations of the two can be employed within the same problem solving system.

In one embodiment, the decision maker to which the master algorithm reports is a human user decision maker, and the human user is presented with the generated solutions for selection of what solution(s) will be used. Alternatively, the decision maker may be a machine or automated system that performs operations in response to the report indicating the solutions. In one embodiment, weighting of results is used. Weighting the results may be particularly important for an implementation involving an automated decision maker, where the weighting allows the automated decision maker to select a particular solution without human intervention. The weights can thus allow configuring a system to put importance on certain aspects of a problem or solution, and thus select a solution based on what are the most significant considerations. When an automated decision is made, the problem solving system may pass information to other systems, issue commands, or perform other operations or cause operations to occur in response to the identified solution(s).

In one embodiment, the factors to consider, the algorithms to execute in which order, and/or the weights or system configuration can be dynamically modifiable with each execution of the system. In this way, user preferences can be considered for different problems with the same problem solving system. Thus, user configuration of the system is possible for each problem solving session allowing the system to adapt to differing conditions without having to modify the underlying problem solving system itself.

As briefly mentioned above, algorithms can be executed in combinations of parallel and sequential execution. Parallel execution refers to multiple algorithms running concurrently. Parallel or concurrent execution does not necessarily imply that algorithms are started at the same time, end at the same time, use the same data to process, or put any other restrictions on execution other than the fact that processing hardware may be configured and executing in accordance with multiple algorithms at a given point in time. For example, a slave algorithm need not wait until a base algorithm generates all potential solutions prior to performing its own processing on one generated solution. In one embodiment, multiple slave algorithms are initiated to process the same generated solution of the base algorithm. The different slave algorithms execute on the same solution based on different detail criteria. Thus, the different slave algorithms process a different subproblem. The different slave algorithms may use the same boundary condition of the base algorithm and provide different solutions to it (e.g., generalized vehicle optimization in the base algorithm could be solved in accordance with specific geometries and loading considerations of a fleet of vehicles for one carrier by one algorithm, and for a different carrier by a second slave algorithm; alternatively, the second slave algorithm could consider actual vehicle availability schedules).

Additionally, or alternatively, the different slave algorithms may use different boundary conditions. For example, a base algorithm may generalize two aspects that could be considered separate problems (e.g., generalized freight costs versus real freight costs, and generalized vehicle selection versus actual transportation carrier selection based on carrier availability and real-world vehicle geometries, etc.).

While such considerations may be processed in parallel, they may also or alternatively be processed sequentially. Sequential algorithm execution refers to providing the output of the base algorithm as the input of a slave algorithm, for example, which slave algorithm output could then be provided as input to another slave algorithm. Such sequential processing may enable considering conditions of different aspects to generate a final solution that satisfies all conditions of the base algorithm, and the two slave algorithms. In this way, a slave algorithm may provide a boundary condition for a second slave algorithm. The detail criteria evaluated by the second slave algorithm is not considered in detail in either the base algorithm or the first slave algorithm.

As briefly set forth above, in one embodiment, the logistical problem could be or include finding a solution to a complex business process having multiple actions, where each action has multiple potential conditions. The use of business processes with multiple potential actions is common in business systems (e.g., scheduling problems and vehicle routing problems). Solving complex business process problems can include the base algorithm generating a plan for business process based on a simplified condition model. The simplified condition model provides a boundary condition, and the slave algorithm indicates additional solutions to the business process plan that are within the boundary condition. For example, the slave algorithm may generate solutions based on a complex condition model factoring real-world condition properties.

An example of solving such a logistical problem includes the base algorithm generating a transportation plan for shipment of goods, where the base algorithm generates a transportation plan based on a simplified linear freight cost model. The slave algorithm generates detailed solutions and/or a feasibility check of the transportation plan based on a complex freight cost model factoring real-world rates and geometric shipping properties. The real-world rates may include pricing tables, non-linear rates, and other complex considerations.

Another example of solving such a logistical problem includes the base algorithm generating a transportation plan for shipment of goods, where the base algorithm generates a transportation plan based on a simplified vehicle space model. The slave algorithm then generates detailed solutions and/or feasibility checks of the transportation plan based on a complex vehicle space optimization model factoring actual geometric shipping properties of goods and transportation equipment. Such complex modeling may include considering stackability of goods to be shipped, three-dimensional vehicle considerations as well as weight load, etc.

In yet another example, of solving such a logistical problem, the base algorithm generates a transportation plan for shipment of goods, where the base algorithm generates a transportation plan based on a simplified transportation service model. The slave algorithm then generates detailed solutions and/or feasibility checks for the transportation plan based on a complex transportation service provider model factoring shipping routes and equipment availability.

Figure 2:
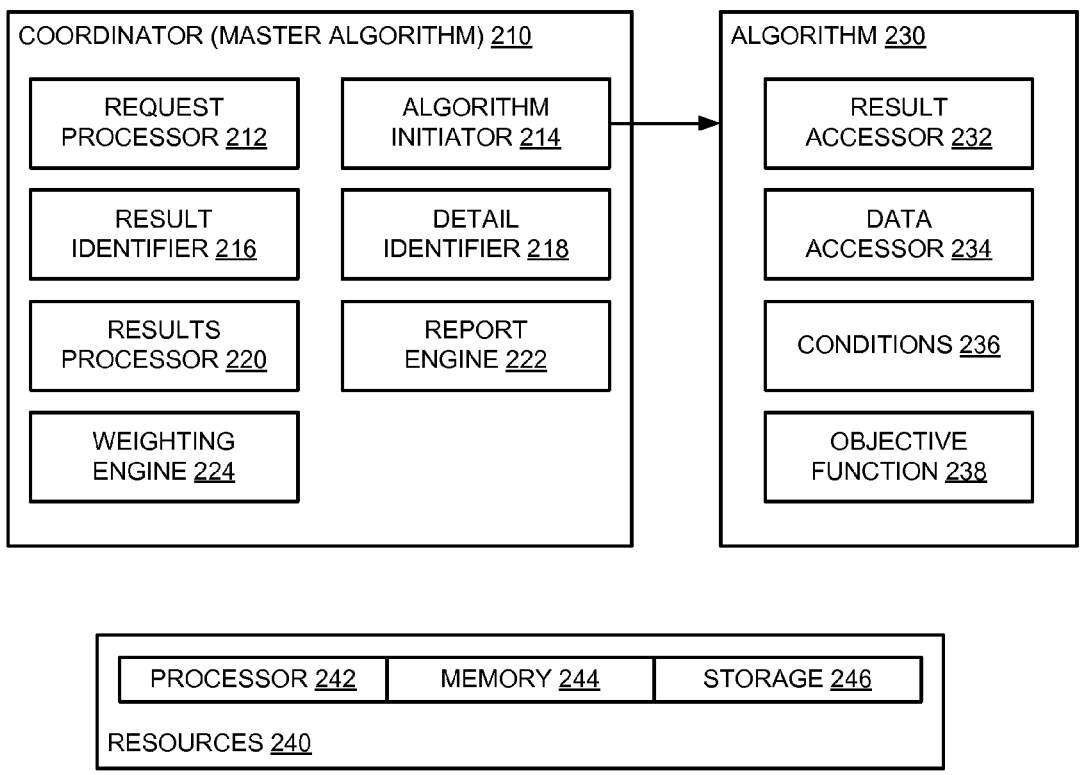
FIG. 2 is a block diagram of an embodiment of a coordinator and an algorithm for a system that combines multiple objective functions in algorithmic problem solving.

FIG. 2 is a block diagram of an embodiment of a coordinator and an algorithm for a system that combines multiple objective functions in algorithmic problem solving. System 200 is a problem solving system according to any embodiment described herein. System 200 includes coordinator or master algorithm 210 and algorithm 230, which may each be modules that perform operations in the system. Also shown as part of system 200 are resources 240, which represent hardware resources that enable the operation of master algorithm 210 and algorithm 230. Resources 240 include one or more processor resources 242, which executes instructions and may perform various operations as described herein. Processor 242 may include any type of microprocessor, processing core, programmable controllers, etc. Memory 244 provides temporary storage for execution code and data (e.g., data structures, a series of instructions or commands, etc.) to be executed by processor 242. Memory 244 may include read-only memory (ROM), flash memory, one or more varieties of random access memory (RAM), or a combination. Storage 246 represents non-volatile storage such as magnetic, optical, and/or semiconductor-based disks that can persist data even despite interruption or removal of power to the system.

Master algorithm 210 includes several functional elements, which provide the ability for master algorithm 210 to perform multiple operations. More or fewer functions could be present in specific implementations of master algorithm 210. In general, master algorithm 210 coordinates the generating of a solution or solutions to a complex problem, including coordinating the action of algorithm 230.

Request processor 212 enables master algorithm 210 to receive a problem and initiate the algorithm to find solutions for the problem. The request may be received, for example, through a user interface portion of an enterprise system. As is understood by those skilled in the art, a user can input a request to perform an "optimization" or generate a plan to perform a business process, or generate a logistics solution.

Algorithm initiator 214 initiates algorithm 230 and any other algorithms that will perform the computations to solve the requested problem. While a single algorithm 230 is shown, as previously described, a base algorithm and one or more slave algorithms can be called in various combinations including parallel or sequential processing to generate solutions to the problems. The algorithms may be separate algorithms and/or multiple instances of one or more of the algorithms. Algorithm initiator 214 may indicate a location in memory 244 and/or storage 246 where information is stored that will be used by algorithm 230 to perform the processing. In one embodiment, at least a portion of the information to be used by algorithm 230 in the processing includes a data structure having one or more conditions to evaluate. The output of algorithm 230 may likewise be a data structure that is passed to master algorithm 210 or stored in memory 244 or storage 246.

Result identifier 216 enables master algorithm 210 to indicate a generated result to an algorithm that will be initiated. Thus, a result of a base algorithm or a slave algorithm can be passed or indicated to another slave algorithm for further processing based on additional parameters or considerations. Detail identifier 218 enables master algorithm 210 to pass the additional parameters or considerations to the slave algorithm for further processing to generate detail results. In the field of transport management, a detail consideration may be to select vehicle type. The vehicle type could be selected from among vehicles within a company's fleet, or based on a contract with an external carrier. In one embodiment, the consideration of vehicle may include consideration of grouping and consolidating goods that will go to the same location or at least along the same route to a stop-off location, etc.

Results processor 220 enables master algorithm 210 to receive results from the algorithms and process the results for presentation to a decision maker (not shown in system 200). Results processor 220 may include filters to extract data from data structures, application programming interfaces (APIs) to generate results to provide to a user interface, and other functional elements. The processing of results by results processor 220 may include weighting certain results. Weighting is discussed in more detail below with respect to weighting engine 224. In one embodiment weighting engine 224 is part of results processor 220.

Reporting engine 222 enables master algorithm 210 to report the processed results to the decision maker. In one embodiment, reporting may take one of three forms: 1) presenting results to user, who makes a selection or decision based on the results presented; 2) weighting results and presenting or reporting the weighted results to an automated decision maker that selects a result as the solution based on weighting over individual objectives; or, 3) weighting results, and presenting the weighted results to a user as suggested results based on weighted sums, from which the user selects the result to use as the solution. Note that reporting can occur asynchronously (as results are generated) or synchronously (after a certain period of time, after a certain number of results are determined, or some other trigger or event). Reporting can include presenting lists, tables, and/or business objects, and may include indicating key factors that were considered in generating the results.

Weighting engine 224 enables master algorithm 210 to selectively apply weights to results. For example, based on all results of all involved slave algorithms, master algorithm 210 may rank all solutions according to predefined criteria. Assume as an example that a base algorithm minimizes objective function f1 and that slaves 2, . . . , n minimize the functions f2, fn, respectively. Master algorithm 210 could return a set of solutions, ranked according to a weighted sum, where result=sum(i=1, . . . , n) wi*fi, with predefined weights w1, . . . , wn for functions f1, . . . , fn. Alternatively, master algorithm 210 could use a hierarchical ranking, where f1 is the first decision criterion, f2 is only used if two plans are equivalent regarding f1, f3 is only used if two plans are equivalent regarding f2, etc. In either case, master algorithm 210 may weight the results based on a "type" of the solution. The type may be based on the algorithm that was used to create the solution (or equivalently said, the primary criterion being evaluated for the result). The summing allows the results of all functions applied by all slave algorithms to a particular solution generated by the base algorithm to be concatenated together.

The base algorithm's objective function f1 does not necessarily have to be the dominant function in a hierarchical ranking; rather, any ordering among the objective functions can define the hierarchy among the functions. In one embodiment, the weights can actually be applied by the slave algorithms themselves. In another embodiment, all solutions received from a particular slave algorithm class or type can be assigned a particular weight (e.g., if multiple instances of a particular algorithm are executing, the same weight may be applied to all solutions from all instances). Different algorithms may be given different weights. For instance, solutions from a particular feasibility algorithm could be weighted by 0.8, while solutions from a different feasibility algorithm could be weighted by 0.2, based on a predefined decision that the solutions of the former feasibility algorithm are more significant than those of the latter feasibility algorithm.

Algorithm 230 includes result accessor 232, which enables algorithm 230 to obtain results to use as bounds, assuming the algorithm is a slave algorithm and will use the results of a previous algorithm. In the case of a base algorithm, the results accessor may not be applicable. Data accessor 234 enables algorithm 230 to obtain additional information that will be applied in the processing of the solution, again assuming algorithm 230 is a slave. The additional information includes details or parameters not considered by the previous algorithm. The additional information could include tables, lists, data structures, etc., to indicate consideration points for algorithm 230.

Algorithm 230 also includes conditions 236, which represents the total of all conditions that will be applied in the processing of the solution. Conditions 236 may be considered to include data accessed by data accessor 236, and additional conditions that are part of algorithm 230. In one embodiment, the processing is iterative processing, which refers to processing that may repeat one or more operations to refine and determine a solution that is at least partially dependent on a previous iteration of processing. Thus, iterative processing may involve using an initial condition, and repeating certain operations a number of times or until convergence of a solution with the intermediary result of the operations being the initial condition of the next iteration. Such processing is understood by those skilled in the art and will not be further discussed. Objective function 238 represents the algorithmic core of algorithm 230 that is executed to generate the solutions.

Figure 3:
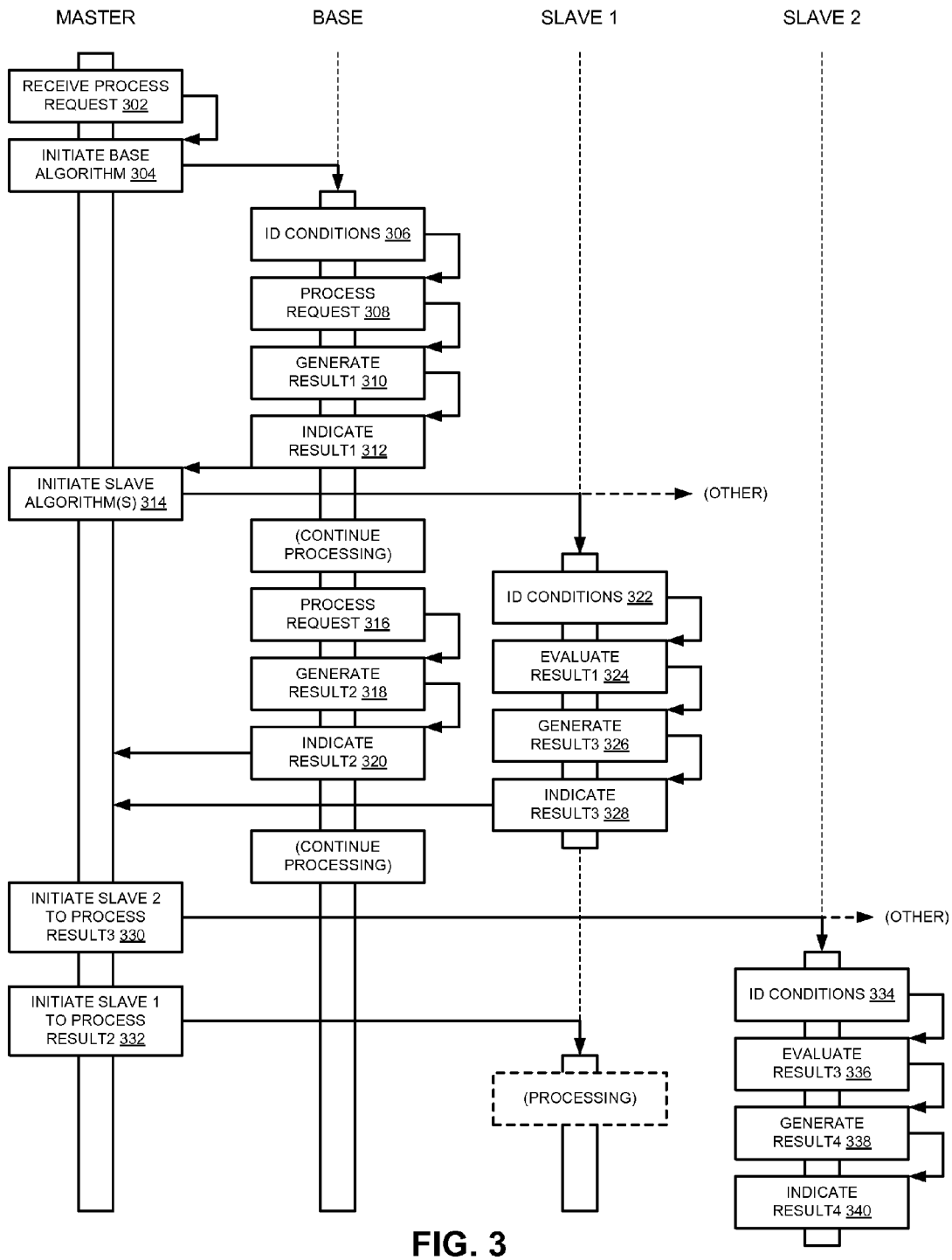
FIG. 3 is a block diagram of an embodiment of a flow of operation in a system that combines multiple objective functions in algorithmic problem solving.

FIG. 3 is a block diagram of an embodiment of a flow of operation in a system that combines multiple objective functions in algorithmic problem solving. The embodiment of the flow can be referred to as a swimlane diagram, which is a type of flow diagram illustrating an example of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

Various acting entities are represented across the top of the swimlane diagram, as examples of entities that perform the various operations. A Master algorithm receives a request to process a problem, 302. The Master algorithm initiates the Base algorithm, 304, to process the problem. Observe the blocks in the background of each entity, under the descriptions of the operations. The background block represents when a particular entity is active. The Master algorithm is considered to be active for any time the problem solving system can be accessed. The Base algorithm initiates from the Master algorithm, and processes until all of its solutions have been generated. Generating the solutions may take an amount of time, or be a number of solutions found, etc. The "end" of the base process is not illustrated in FIG. 3.

The Base algorithm begins operation and identifies the conditions associated with its execution, 306. The conditions are generally information stored within the Base algorithm itself or somewhere within the problem solving system that indicates what the Base algorithm evaluates. The Base algorithm receives as input data that indicates specifics for the problem to be solved, such as locations, times, quantities of goods, services required, resources affected, etc. The Base algorithm processes the request based on the conditions, 308, and generates a result, referred to as Result1, 310. The Base algorithm can then indicate Result1 to the Master algorithm and continue processing to generate other potential solutions.

The Master algorithm initiates one or more slave algorithms, 314, in response to receiving Result1. For example, Slave 1 is initiated to process Result1. Slave 1 operates in parallel with the continued processing of the Base algorithm. Another slave algorithm (not shown) could also execute in parallel to Slave 1 to process Result1. The Base algorithm continues processing by processing the request further, 316, using the Result1 as a basis for its continued processing, generating Result2, 318, and indicating Result2 to the Master algorithm, 320. Concurrently or in parallel Slave 1 identifies the conditions associated with execution of Slave 1, 322. The conditions of Slave 1 include the bounds of Result1. Slave 1 processes the request to evaluate Result1, 324, generates Result3, 326, and indicates Result3 to the Master algorithm, 328. Although shown as happening at substantially the same point in time, there is no requirement or guarantee that the processing of Slave 1 will generate Result3 at any time close to the Base algorithm generating Result2, but is merely shown as it is for convenience in description. The Base algorithm could produce many results in the time it takes Slave 1 to process Result1. Alternatively, Slave 1 could generate Result3 prior to the Base algorithm producing Result2.

Note that while the Base algorithm continues to process, Slave 1 may actually stop executing after generating a result or a result set. Result3 could be a single result, such as a feasibility check, or it could represent one result of a set, or the entire result set.

At some time after receiving Result3 from Slave 1, the Master algorithm could initiate a sequential operation by Slave 2 (and potentially other slaves) to process Result3, 330. Slave 2 would then follow a similar pattern as the other algorithms, and identify the conditions associated with its execution, 334, including obtaining Result3, and additional data or detail criteria to perform additional, detail processing. Slave 2 then evaluates Result3, 336, and generates Result4, 338, which is indicated to the Master algorithm, 340.

The Master algorithm could also initiate another instance of Slave 1 to process Result2 generated by the Base algorithm. The additional instance of Slave 1 could actually execute in parallel to the first instance of Slave 1 described above with regards to 322-328. Slave 1 could then perform processing on that result.

The processes could continue until all solutions are found, and all results are evaluated.

Figure 4:
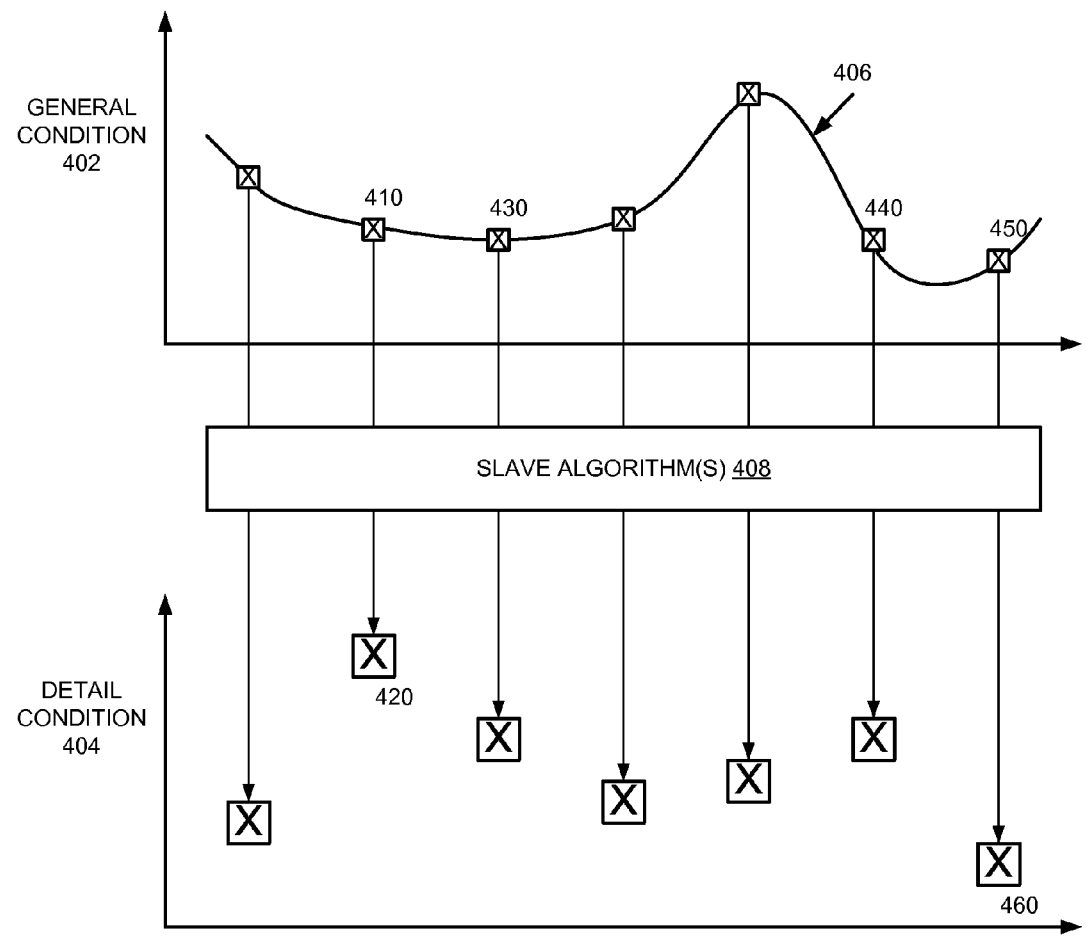
FIG. 4 is an embodiment of a representation of problem solving results.

FIG. 4 is an embodiment of a representation of problem solving results. Curve 406 represents an example of the path of operation that could show how a base algorithm process execution is proceeding. Curve 406 is the base algorithm that evaluates the problem in reference to a general condition 402. Each of the marked points on curve 406 is sent to one or more slave algorithms 408 for detail processing. The results in relation to the detail condition 404 are shown below curve 406. As will be understood from the discussion above, each point is a solution that can be evaluated as a set or as a specific result by a slave algorithm.

Curve 406 may contain hundreds or even thousands of points. Consider that the base algorithm is configured to output a solution every 100 iterations, or every minute of execution time, for example. In one embodiment, a master algorithm is configured to indicate how often the base algorithm should output a result. The solution points need not necessarily be evenly spaced, although it is illustrated as evenly spaced in FIG. 4. In terms of results, consider that under the general condition 402, the lowest point is the most desirable outcome. In that case, point 450 appears to be the "best" solution to the problem, given it lies lower on curve 406 than any of the other output points. While there are other points on curve 406 that lie lower than point 450, they are not considered seeing they were not selected. In one embodiment, a best solution over the time period is selected, which may enable one of the lower points to be evaluated further in other implementations.

However, if only the base algorithm were used, as has been done traditionally, a much better solution might be passed up. For example, consider that the detail condition 404 involves detail criteria that significantly alter what is considered to be the most important consideration. Consider that in relation to the detail condition 404, the higher the point the better the solution. In such a case, the solution of point 450 could be evaluated and found to be the worst of the evaluated potential solutions, lying down at point 460 on the graph space. Instead, the solution of point 410 is evaluated and point 420 is generated, which produces the best solution.

Lastly consider points 430 and 440 of curve 406. Assume that these points represent the same solution. In one embodiment, the solution of point 440 is not passed for evaluation by the slave algorithm(s) 408, because the solution is already evaluated at point 430. Instead, a solution directly before or after, or a next-best solution could be sent for additional evaluation.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be considered in an illustrative, and not a restrictive sense. The scope of the invention should be measured solely by reference to the claims that follow.

What is claimed is:

1. A method comprising:
    initiating from a computing system having a problem solving module, a base algorithm to perform iterative processing to generate multiple solutions to a logistical problem related to supply chain management, the logistical problem having multiple solutions, where the generated solutions satisfy all conditions of the base algorithm;
    indicating, responsive to the base algorithm generating solutions, detail criteria and an identified one of the multiple solutions generated by the base algorithm to a slave algorithm, where the identified solution provides a boundary condition for the slave algorithm with respect to one of the conditions of the base algorithm, and where the detail criteria are conditions of the slave algorithm and indicate information defining the boundary condition of the base algorithm, where the detail criteria are not evaluated as conditions of the base algorithm;
    initiating the slave algorithm to perform iterative processing to generate one or more detail solutions to the logistical problem based on the identified solution of the base algorithm, the detail solutions indicating solutions that satisfy both the boundary condition and the detail criteria;
    indicating different detail criteria and an identified one of the detail solutions of the slave algorithm to a second slave algorithm, where the different detail criteria are not evaluated as conditions of the slave algorithm, and where the identified detail solution provides a second boundary condition for the second slave algorithm with respect to one of the conditions of the slave algorithm;
    initiating the second slave algorithm to perform iterative processing to generate additional detail solutions to the logistical problem based on the identified detail solution of the slave algorithm, the additional detail solutions indicating solutions that satisfy both the second boundary condition and the different detail criteria; and
    reporting the feasibility check to a decision maker.

2. The method of claim 1, wherein indicating the identified solution to the slave algorithm comprises: indicating a best solution identified for a period of time or a number of processing iterations.

3. The method of claim 2, wherein the best solution identified comprises a best unique solution identified within the period of time or number of processing iterations that has not been previously identified as a solution.

4. The method of claim 1, wherein initiating the slave algorithm comprises:
    initiating the slave algorithm prior to a completion of operation of the base algorithm.

5. The method of claim 1, wherein the detail solutions comprise feasibility checks associated with the identified solution, where the feasibility checks indicate feasibility of the identified solution based on how the identified solution satisfies the detail criteria in light of the boundary condition.

6. The method of claim 5, wherein the feasibility check comprises a numeric value normalized to a predicted optimum solution given the conditions and the detail criteria.

7. The method of claim 5, further comprising: identifying the identified solution as belonging to a type of solution; and applying a weight to the feasibility check prior to reporting the feasibility check to the decision maker, the weight representing a predetermined significance based on the type of solution.

8. The method of claim 1, wherein reporting to the decision maker comprises: reporting to an automated system that automatically causes one or more operations to occur in response to the report associated with the identified solution.

9. The method of claim 1, wherein the logistical problem comprises a finding a solution to a complex business process having multiple actions, each action having multiple potential conditions, wherein the base algorithm generates a business process plan with a simplified condition model, the simplified condition model providing the boundary condition, and wherein the slave algorithm indicates additional solutions to the business process plan based on a complex condition model factoring real-world condition properties.

10. The method of claim 1, wherein the logistical problem comprises generating a transportation plan for shipment of goods, wherein the base algorithm generates a transportation plan with a simplified linear freight cost model, and wherein the slave algorithm generates detail solutions for the transportation plan based on a complex freight cost model factoring real-world rates and geometric shipping properties.

11. The method of claim 1, wherein the logistical problem comprises generating a transportation plan for shipment of goods, wherein the base algorithm generates a transportation plan with a simplified vehicle space model, and wherein the slave algorithm generates detail solutions for the transportation plan based on a complex vehicle space optimization model factoring actual geometric shipping properties of goods and transportation equipment.

12. The method of claim 1, wherein the logistical problem comprises generating a transportation plan for shipment of goods, wherein the base algorithm generates a transportation plan with a simplified transportation service model, and wherein the slave algorithm generates detail solutions for the transportation plan based on a complex transportation service provider model factoring shipping routes and equipment availability.

13. An article of manufacture comprising a machine-readable storage medium having content stored thereon to provide instructions to cause a machine to perform operations including:
   initiating from a computing system having a problem solving module, a base algorithm to perform iterative processing to generate multiple solutions to a logistical problem related to supply chain management, the logistical problem having multiple potential solutions, where the generated solutions satisfy all conditions of the base algorithm;
   indicating, responsive to the base algorithm generating solutions, detail criteria and an identified one of the multiple solutions generated by the base algorithm to a slave algorithm, where the identified solution provides a boundary condition for the slave algorithm with respect to one of the conditions of the base algorithm, and where the detail criteria are conditions of the slave algorithm and indicate information defining the boundary condition of the base algorithm, where the detail criteria are not evaluated as conditions of the base algorithm;
   initiating the slave algorithm to perform iterative processing to generate one or more detail solutions to the logistical problem based on the identified solution of the base algorithm, the detail solutions indicating solutions that satisfy both the boundary condition and the detail criteria;
   indicating different detail criteria and an identified one of the detail solutions of the slave algorithm to a second slave algorithm, where the different detail criteria are not evaluated as conditions of the slave algorithm, and where the identified detail solution provides a second boundary condition for the second slave algorithm with respect to one of the conditions of the slave algorithm;
   initiating the second slave algorithm to perform iterative processing to generate additional detail solutions to the logistical problem based on the identified detail solution of the slave algorithm, the additional detail solutions indicating solutions that satisfy both the second boundary condition and the different detail criteria; and
   reporting the feasibility check to a decision maker.

14. The article of manufacture of claim 13, the content to provide further instructions for performing a sequential processing operation by initiating a second slave algorithm to evaluate a selected one of the detail solutions of the slave algorithm based on different detail criteria not evaluated as conditions of the slave algorithm.

15. A system comprising:
   a data storage device to store conditions related to processing of a logistical problem related to supply chain management, the logistical problem having multiple potential solutions, including a quantized condition representing a simplified model of a property of the logistical problem, and detail criteria that define details of the quantized condition representing a complex model of the property;
   a base algorithm to perform iterative processing to generate multiple solutions to the logistical problem, based on the quantized condition, where the generated solutions satisfy the quantized condition;
   a slave algorithm to perform iterative processing to generate detail solutions for a solution generated by the base algorithm, based on the detail criteria and a potential solution generated by the base algorithm, where the detail solutions satisfy both the quantized condition of the base algorithm and the detail criteria of the slave algorithm, where the detail criteria are conditions of the slave algorithm not evaluated as conditions of the base algorithm; and
   a master algorithm to receive a request to process the logistical problem, initiate the base algorithm, receive a potential solution from the base algorithm, and initiate the slave algorithm indicating the potential solution and the detail criteria to the slave algorithm.

16. The system of claim 15, wherein the base algorithm generates a business plan including actions to implement the business plan, and wherein the slave algorithm indicates a feasibility of the business plan.

17. The system of claim 16, wherein the master algorithm collects the multiple solutions generated by the base algorithm, initiates the slave algorithm to evaluate each of the multiple solutions, collects feasibility checks generated by the slave algorithm, and presents the collected feasibility checks and solutions to a decision maker.

18. The system of claim 17, wherein the master algorithm selectively weights the feasibility checks prior to presenting to the decision maker.

19. The system of claim 15, wherein the logistical problem comprises generating a transportation plan for shipment of goods, wherein the base algorithm generates a transportation plan based on the quantized condition representing a simplified transportation model, and wherein the slave algorithm indicates detail solutions for the transportation plan based on the detail criteria representing a complex transportation model factoring real-world shipping properties.

* * * * *